March 16, 1971  KEIJI KOGAKI  3,570,328
HYDRAULIC CONTROL SYSTEM OF AN AUTOMATIC TRANSMISSION
Filed April 4, 1969  5 Sheets-Sheet 1

INVENTOR
Keiji Kogaki
BY George B. Auyevoch
ATTORNEY

United States Patent Office 3,570,328
Patented Mar. 16, 1971

3,570,328
HYDRAULIC CONTROL SYSTEM OF AN AUTOMATIC TRANSMISSION
Keiji Kogaki, Toyota-shi, Japan, assignor to Toyota-Jidosha Kogyo Kabushiki Kaisha, Toyota-shi, Japan
Filed Apr. 4, 1969, Ser. No. 813,680
Claims priority, application Japan, May 15, 1968, 43/32,734
Int. Cl. B60k 21/00
U.S. Cl. 74—867                           5 Claims

ABSTRACT OF THE DISCLOSURE

A hydraulic servo mechanism for the first two speeds of a three speed transmission. Pressure on the clutches and brakes for the first two speeds is selectively applied according to the valve spool position of a one-two shift valve which has governor pressure line connected to one end and pressure means connected to the other end. These pressure means supply either line pressure or throttle pressure depending on a check valve regulating said pressure means. According to the present invention, this pressure means has a pressure reducing valve having an output line connected to the one-two shift valve and an input line which couples the check valve to the pressure reducing valve. The interconnection of these output and input lines within said pressure reducing valve is regulated by spring biased valve spool means. Coupled to the pressure reducing valve is an adjustable pilot valve which controls the pressure in the pressure reducing valve. Thus, the pressure reducing valve permits only a predetermined output to be fed to said one-two speed valve and the one-two speed valve is prevented from having fed to it an input greater than the predetermined input.

BACKGROUND OF THE INVENTION

The present invention relates to a hydraulic control system of an automatic transmission of the type used in motor vehicles and more particularly to the regulation of the speed shift of such a transmission.

This invention provides for an improved pressure control system for an automatic transmission having a fluid torque converter and a speed change gear arrangement with a hydraulic servomechanism, brake bands, clutches, etc. In this type of hydraulic servo mechanism, pressure on the clutches and brakes for the first two speeds is selectively applied according to the valve spool position of a one-two shift valve. This one-two shift valve has a governor pressure line connected to one end and pressure means are connected to the other end. These pressure means either supply a line pressure or throttle pressure, depending in turn on a check valve regulating said pressure means. According to the present invention, this pressure means has a pressure reducing valve having an output line connected to the one-two shift valve and an input line which couples the check valve to the pressure reducing valve. The interconnection of these output and input lines within said pressure reducing valve is regulated by spring biased valve spool means. Coupled to the pressure reducing valve is an adjustable pilot valve which controls the pressure in the pressure reducing valve. A branch pressure line from a suitable position is coupled to the pressure reducing valve or on the output side thereof between the pressure reducing valve and the one-two shift valve. A valve element closed by means of a spring force is provided at the opening of said branch pressure line.

Thus, the pressure reducing valve permits only a predetermined output to be fed to said one-two shift valve and the one-two shift valve is prevented from having fed to it an input greater than the predetermined input.

The invention as well as other objects and advantages thereof will become apparent from the following detailed description when taken in conjunction with the accompanying drawings, in which:

EXPLANATION OF THE INVENTION

In an automobile with automatic transmission, there is a manual valve with indications (D) for the drive range (2) for the second range and (L) for the low range. When the driver starts his vehicle, he usually places the manual valve in the drive (D) range position and starts off. At first, he travels slowly, at low or first speed. Then, as he accelerates, the automatic transmission will automatically shift into second speed and finally into third speed. Thus, the terms "third speed" and "drive range (D)" do not mean the same, since a vehicle sometimes travels at the first speed while in the drive (D) range.

Figure 1:
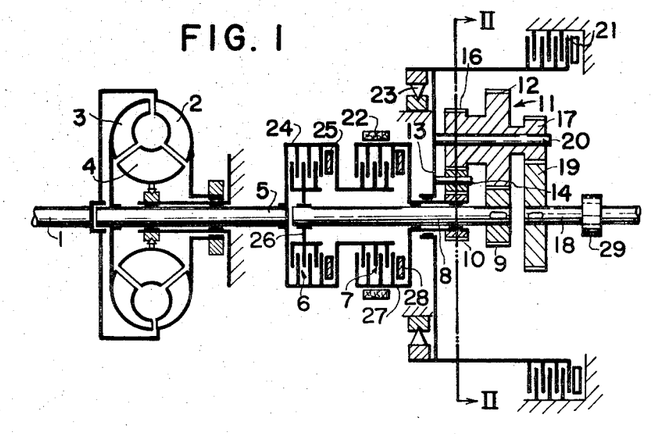
FIG. 1 is a schematic diagram of one example of an automatic transmission in which a hydraulic control system according to the present invention is applicable.

The hydraulic control system of the present invention is applicable to an automatic transmission having a torque converter composed of a pump, a turbine, a stator etc. and a speed change gear arrangement controlled by brake bands, clutches etc. FIG. 1 shows a schematic diagram of one example of an automatic transmission system of three speeds forward and one speed reverse. Thus, as shown in FIG. 1, there is a pump impeller 2 being directly coupled to an engine crank shaft 1. Engine power is transmitted to a turbine runner 3 by pump impeller 2 through oil. The oil is guided by a stator 4 to again enter the pump impeller 2.

Thus, power is continuously supplied to turbine shaft 5 by repetition of the above oil-flow cycle. The power from the turbine so obtained is transmitted to a speed change gear unit provided behind the torque converter. This power transmission is obtained by using an automatic control for the multiple disc clutches 6, 7, brake bands 22 and low and reverse clutches 21, also, using the required servo oil pressure, by a planetary gear unit, and also, a speed change gear of three-speed forward and one-speed reverse.

SPEED CHANGE, CLUTCHES AND GEARING

The speed change gearing is provided behind the torque converter. The turbine runner 3 is connected to the turbine shaft 5 to act as an input shaft of a planetary gear unit. This turbine shaft 5 is connected to a drum 24 by splines. Inside the drum there is a multiple disc front clutch 6 which is operated by a hydraulic piston 25 through a back spring either to ON (work) or to OFF (release). The drive plates of this front clutch 6 are coupled to the drum by a spline on their outer periphery and are prevented from rotation by a hub 26 and by splines on their inner periphery. The hub 26 is connected with an intermediate shaft 8 by splines.

Figure 2:
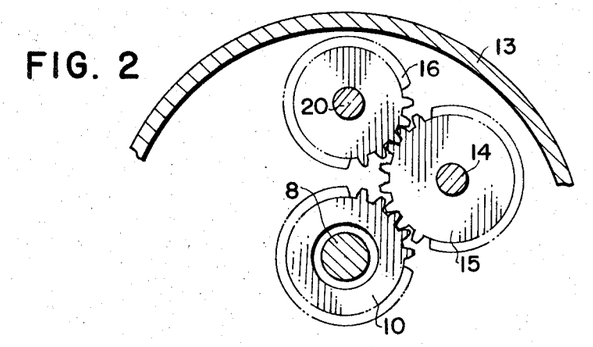
FIG. 2 is a part of section A—A in FIG. 1 showing in detail the relationship between certain gears not shown in FIG. 1.

The front clutch drum 24, as shown in the diagram, prevents clutch discs of a multiple disc rear clutch 7 from rotation by splines and rotates in one unit with the rear clutch. The outer periphery of the clutch discs of rear clutch 7, are connected to a clutch drum 27 with splines, and the rear clutch is operated ON (work) or OFF (release) by a piston 28. The intermediate shaft 8 connected to hub 26 of the front clutch 6 works as one unit with an input sun gear 9 at its rear end. The input sun gear 9 engages with a gear 12 and a suitable number of pinions 11 of planetary gears (for instance 2 or 3 sets) arranged on the periphery. The reverse sun gear 10 engages with an idler gear 15 which is slidably fitted on a pin 14 mounted on a carrier 13 and said idler gear 15 engages with a gear 16 of the above pinions 11.

A gear 17 situated at the rear end of the pinions 11 engages with a gear 19 of the output shaft 18 of 12, 17 are held by a pinion pin 20 and also the idler gear 15 as explained above are held by the pinion pin 14 upon carrier 13. The carrier 13 is provided with the low and reverse clutch 21 for braking (or an equivalent brake) which can be fixed to stop or can be released free by acting on or releasing the low and reverse clutch 21. Similarly, the rear clutch drum 27 has a band 22 on its outer periphery. Thus, the drum 27, and its associated sun gear 10 can be fixed to stop or can be released free. One-way clutch 23 on carrier 13 performs the same function as the low and reverse clutch 21 under the low gear condition later explained.

For a better understanding of the speed change operation, the following explanation is given with reference to the operation for a three-speed forward and a one-speed reverse drive which is obtainable from the foregoing arrangement of clutches and gears.

The first speed

The front clutch 6 and the low and reverse clutch 21 are to be operated. (However, when driving from the engine side, the one-way clutch 23 also engages. The resulting operation is the same as the operation of the low and reverse clutch 21, so that, when the operation of one way clutch 23 is provided, operation of the low and reverse clutch 21 is not necessary. However, in this case, power is not transmitted from the output shaft.) Under such conditions, the rotation of the turbine shaft 5 is transmitted to the input sun gear 9 through the front clutch 6. Since the carrier 13 is held by the low-and-reverse clutch 21, the pinion 20 is also fixed and the input rotation is transmitted from the gear 9 through the gear 12 and gear 17 to the gear 19 of output shaft and reduced according to the necessary relationship as in the case of usual gears.

The second speed

The front clutch is kept in the applied condition, and the low and reverse clutch 21 is released free and the band 22 is actuated. Thus, the turbine shaft 5 and the input sun gear 9 rotate as one body, however the clutch drum 27, and also the reverse sun gear 10 is fixed by band 22 and comes to a standstill. In this condition, the rotation of turbine shaft 5 is transmitted to the input sun gear 9, thus the pinions 11 are going to rotate in the opposite direction (counter-clockwise direction) to the rotating direction of the turbine shaft 5 (clockwise-direction). This motion acts on the gear 15 to rotate in the clockwise direction through the gear 16, however, since the gear 10 meshing with gear 15 is fixed, the pinion pin 14 rotates in the clockwise direction. This rotating motion is additionally applied to the input sun gear 9, which is same as the turbine shaft 5, and gear 19 of output shaft. The degree of this coupling, because the number of teeth of gear 12 is more than of gear 17, becomes greater on the output side than that on the input side, thus the rotational speed of the output shaft becomes less than input shaft 8.

The third speed

This is obtained by operation of both the front and the rear clutch. Because the input sun gear 9 and the reverse sun gear 10 rotate in a body, the entire of planetary gearing also rotates in a body consequently the output shaft 18 rotates the same as the turbine shaft 5 rotates.

Reverse speed

The rear clutch 7 and the low and reverse clutch 21 are operated. Then, the carrier 13, and accordingly pinions 14 and 20 are fixed and rotation from the turbine shaft 5 is transmitted to the reverse sun gear 10 through the rear clutch 7 and then to gear 19 of output shaft through gear 11 and pinion 17, thus the output shaft 18 rotates in reverse.

For a better understanding of the invention, the operation of the various clutches and gearing is summarized in Table I:

TABLE I

First speed (reduction)

Clutches:
Gearing
    6 fixed _________ 9 rotates.
    21 fixed ________ 13 fixed.
    23 also fixed ____ 20 fixed, 12 rotates, 17 rotates, 19 rotates.

Second speed (reduction)

6 fixed _________ 9 rotates.
    21 free _________ 10 rotates ccw.
    22 fixed ________ 16 rotates.
    27 fixed ________ 10 fixed.
    22 fixed ________ 15 rotates cw., 14 rotates cw., 12 rotates, 17 rotates, 19 rotates.

Third speed (equal)

In third speed, all gears and clutches operate and the transmission from front side to rear side is equal.

Reverse speed (reduction)

7 fixed ____________ 13 fixed.
21 fixed ___________ 14 fixed, 20 fixed, 10 rotates, 11 rotates, 17 rotates, 19 rotates.

The present invention relates to the hydraulic control system for the servo oil pressure acting on the above clutches 6, 7, 21 and the brake band 22. In the hydraulic diagram shown in FIG. 3, the oil is pumped up from an oil sump 50 by an oil pump 51 directly driven by the engine through the pump impeller 2 to be supplied to the line pressure passage 101. The oil pressure of this passage 101 is adjusted by a pressure regulator valve 52 to be transmitted to a vacuum throttle valve 53 and a throttle valve 54. Negative pressure of the suction pipe is perceived by the vacuum throttle valve 53 as a valve displacement, thus oil pressure proportional to this change is produced in the line 102, which is called vacuum throttle pressure ($Pvth$). Further, the opening of the engine throttle valve is perceived as a plug displacement by the throttle valve 54 and this displacement, that is, the oil pressure proportional to the opening is produced in the line 103. This is called throttle pressure ($Pth$). Also, the car speed is detected by a governor 29 driven by the output shaft to be supplied to the line 104 as governor pressure ($Pgo$). By means of shift valves (speed change valves) 56, 59 operated by the throttle pressure $Pth$ and the governor pressure $Pgo$, the reduction ratio of the planetary gear unit is changed.

Figure 3:
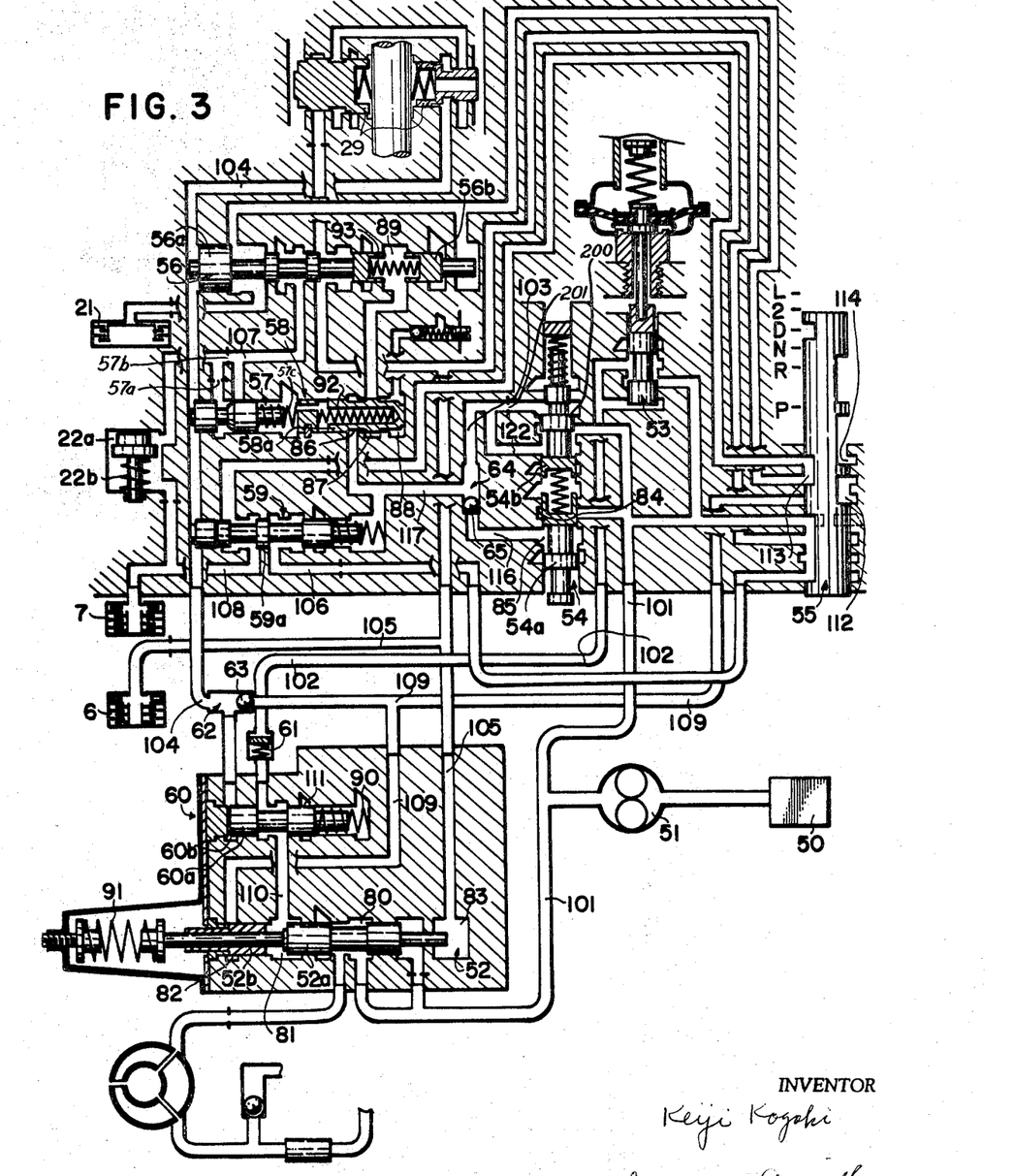
FIG. 3 shows a diagram of an entire hydraulic system showing the operating conditions of the various drive ranges.
Figure 7:
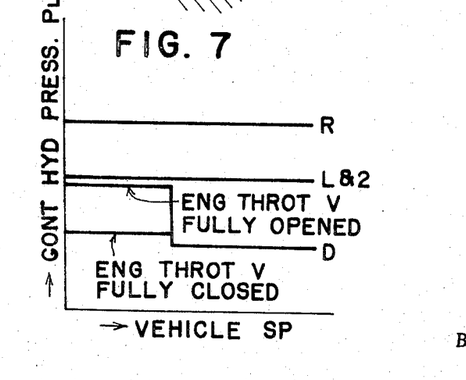

Namely, in the drive (D) position of manual valve 55 the line pressure ($P_L$) is supplied to the pressure lines 105, 106 which link the manual valve to the front clutch 6 and to the rear clutch 7. In the second speed position the line pressure is supplied to pressure line 105 which links the manual valve 55 to the front clutch 6. When the governor pressure is low, the oil passage is opened for the rear clutch 7 and band 21 and the first speed condition is obtained by the front clutch 6 and the one way clutch 23. When the car speed has attained a speed nearly equivalent to the opening of the throttle valve, the one-two shift valve 56 is actuated by the governor pressure ($Pgo$) to move downwards to connect pressure line 105 to pressure line 107. Then the line pressure ($P_L$) acts on the band 22 and the front clutch 6, thus the second speed condition is obtainable. If the car velocity has attained a further speed corresponding to the opening of the throttle valve, the two-three shift valve 59 is actuated by governor pressure ($Pgo$) to move down to connect the pressure line 106 to the pressure line 108 and the line pressure ($P_L$) works on the front clutch 6, rear clutch 7 and also the release side 22b of band 22. Thus, band 22 is released, the planetary gear unit rotates as one gear train to make the output shaft coupled directly to the turbine shaft for direct drive so that the third speed condition is obtainable. This is only applicable in the drive (D) range. Moreover, in reverse of the foregoing, the gear change from direct drive to reduction drive is obtainable by relieving the pressure of lines 106, 107 by the one-two-shift valve 56 and the two-three shift valve 59. Now, the pressure control for the line pressure ($P_L$) applied to the above brakes and clutches is to obtain the pressure regulator valve 52 and the pressure characteristic which is obtainable in the pressure control system of the embodiment of this invention shown in FIG. 3 is as illustrated in FIG. 7. That is, in the drive (D) range, a constant oil pressure diagram which rises gradually in proportion to the opening of the engine throttle valve is obtainable when the speed is low, and a low and constant oil pressure diagram form regardless of the valve opening is obtainable when exceeding a certain speed.

In the low (L) range and second (2) range, a constant high pressure diagram form regardless either of the opening of the engine throttle valve or of the car speed is obtainable. Also in the (R) reverse range a constant high pressure diagram form regardless either of the engine throttle valve or of the car speed is obtainable, which is similar to the low (L) range and second (2) range. However reverse (R) range produces even a higher line than low (L) range of (2) second range.

Further, because of the extremely effective function of the engine brake, when changing the manual valve 55 from drive (D) range to the second (2) range or from the second (2) range to the low (L) range while running: The pressure changes so as to lower the control pressure to a constant car velocity which is the most favourable pressure for the usual running condition at the drive (D) range and also a constant high pressure irrespective of the car speed at the low (L) range and second (L) range is obtainable.

There will now be explained the operating conditions of the respective speeds and the pressure hereinbefore described characteristics which are obtainable: At first, in the drive range since the line pressure of line 109 is exhausted at the manual valve 55 through lines 112 and 113, 114, the pressure is not working on line 109 and the check ball 63 of ball check valve unit 62 is pressed downwards by the governor pressure ($Pgo$) of line 104 to shut off line 109 and to open the line 104. Thus the governor pressure of said line 104 is always acting on the chamber 60b of relay valve 60.

Assuming now the condition that the car speed is low, the valve piece 60a of relay valve 60 has moved rightwards (as shown in FIG. 3) and the vacuum throttle valve pressure ($Pvth$) is supplied to line 110, then said pressure ($Pvth$) is supplied to chamber 81 of pressure regulator valve 52 to move valve spool 52a rightwards with co-operation of coil spring 91, so that oil in the lower chamber 80 is getting a pressure corresponding to the pressure in the upper chamber, i.e., line pressure ($P_L$) supplied to the required clutches and brake bands from the line 101.

Further, the line pressure ($P_L$) is low when the vacuum throttle pressure ($Pvth$) is low and becomes high when the vacuum throttle pressure ($Pvth$) is high. This condition is shown in the section of low car speed of the D line in FIG. 7.

When the car speed becomes faster, valve piece 60a of relay valve 60 moves rightwards, line 110 has been connected with the line 111, the oil pressure in chamber 81 of pressure regulator valve 52 is relieved through the line 110 and 111. Therefore the valve spool 52a overcomes the spring pressure of coil spring 91 to move upwards. Thus, oil in chamber 81 is discharged to line 110, so that the pressure of chamber 80 is always kept a low constant pressure irrespective of the throttle pressure to be supplied from the line 101 as line pressure ($P_L$). This condition is shown in the section of high car speed of D line in FIG. 7.

In the low (L) range and second (2) range, since the line 101 and line 109 are connected to each other by manual valve 55 line pressure ($P_L$) of line 101 is also supplied to line 109. The line pressure overcomes the governor pressure of line 104 to move the ball 63 of check ball valve unit 62 to the upper position so as to shut off line 104 and open line 109. Thus the line pressure of line 109 always acts chamber 60b of relay valve 60. Further, because this line pressure is always kept higher than the governor pressure ball 63 of check ball unit 62 always positions itself upwards and also land 60a in relay valve 60 is always kept at the lower position by the line pressure ($P_L$) to connect line 110 with the relief line 111 to relieve the pressure in chamber 81 of pressure regulator valve 52. On the other hand, since line 109 is connected to chamber 82 of pressure regulator valve 52, the line pressure is supplied to chamber 82 in this range condition to act on i.e., the second (2) range and low (L) range a slide valve 52b in chamber 82 to move the slide valve 52b in the downward direction.

With the working force of slide valve 52b acting on valve land 52b of pressure regulator valve 52 together with spring pressure of spring 91 as a downward force, the pressure of chamber 80 becomes a constant high pressure corresponding to this working force to be supplied to the brakes and clutches as servo pressure from the line 101.

The L and 2 line in the characteristic diagram of FIG. 7 shows the control pressure obtainable in the above control. As explained in this diagram, the line pressure PL in the low (L) range and second (2) range is obtained as a constant pressure irrespective either of the throttle valve opening or of the car speed.

In the reverse (R) range, the oil pressure working in the chamber 83 of pressure regulator valve 52 under the operating condition of oil pressure in the above low (L) range and second (2) range is relieved through line 105 and line 115. Thus pressure does not work on chamber 83, so that the control pressure in said range is obtainable as a higher constant pressure than the control pressure in the low (L) range and second (2) range.

This is shown by the R line in the characteristic diagram of FIG. 7. As explained in this diagram, the line pressure ($P_L$) obtained in this range is also a constant pressure irrespective either of the throttle valve opening or of the car speed.

The line pressures $P_L$ corresponding to the characteristics described are selected by operation of one-two shift valve 56 and two-three shift valve 59 to be applied to the required brakes and clutches, so that the automatic transmission gear trains having the first speed, the second speed and the third speed are assembled. However, the shift valves 56, 59 selecting these line pressures ($P_L$) are controlled as follows: (first), by the governor pressure ($Pgo$) and throttle pressure ($Pth$) when there is a small opening of engine throttle valve; and (second), by the governor pressure ($Pgo$) and line pressure ($P_L$) when there is a large opening of engine throttle valve. These shift valves 56, 59 must work adequately when the car speed has attained the predetermined speed. However, when carrying out the automatic speed change in the fully opened condition of the engine throttle valve, the shift valves 56, 59 are to be controlled by the governor pressure ($Pgo$) and line pressure ($P_L$) and moreover the line pressure ($P_L$) is to be kept at a constant high pressure up to a certain car speed not only in the second (2) range but also in the drive (D) range as shown by the control diagram in FIG. 7, so that the governor pressure ($Pgo$) cannot overcome the high pressure of line pressure ($P_L$) and one-two shift valve 56 does not work even if the predetermined car speed is attained. This makes automatic speed change from the first speed to the second speed impossible. Therefore when the car is running under the first speed condition, the engine rotates excessively.

Moreover, the maximum number of revolutions for the engine is different depending upon the kind of engine, therefore the one-two shift valve 56 must be so adjusted that the speed change from the first to the second speed may be carried out when attaining the number of revolutions adaptable to the particular engine.

Figure 4:
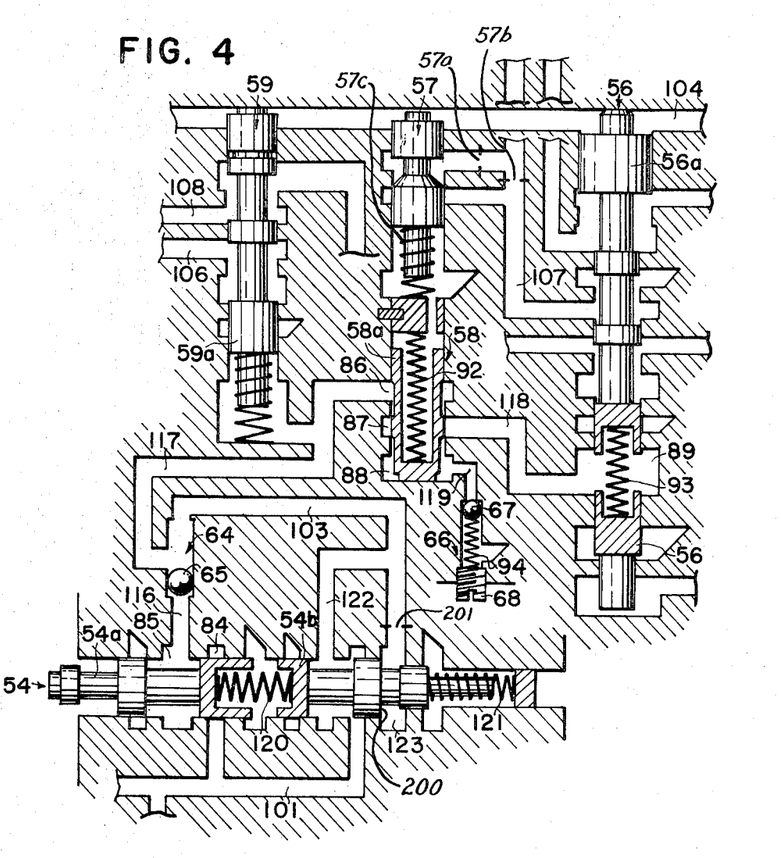
FIG. 4 is an enlarged view of a portion of the diagram shown in FIG. 3 rotated 90° for ease of explanation showing the disposition of components in case a reducing valve does not work.
Figure 5:
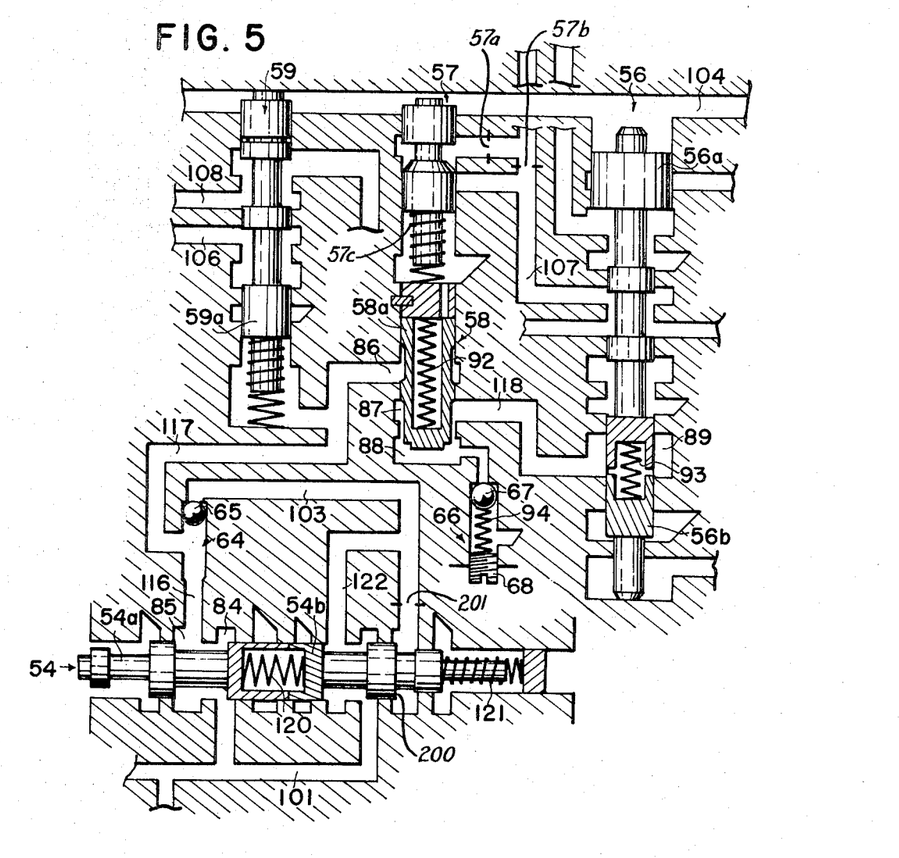
FIG. 5 is an enlarged view of a portion of the diagram shown in FIG. 3 likewise rotated 90° showing the disposition of components in case the reducing valve has worked.

One of the features of the present invention is to enable the shift valve to function satisfactorily when required notwithstanding the defects and disadvantages hereinbefore outlined. This feature is explained in detail with reference to FIG. 4 and FIG. 5 which highlight the operation of certain components among which the following are important:

(a) Throttle valve 54
(b) One-two shift valve 56
(c) Two-three shift valve 59
(d) A ball check valve 64
(e) Pressure reducing valve 58
(f) Pilot valve unit 66

Figure 6:
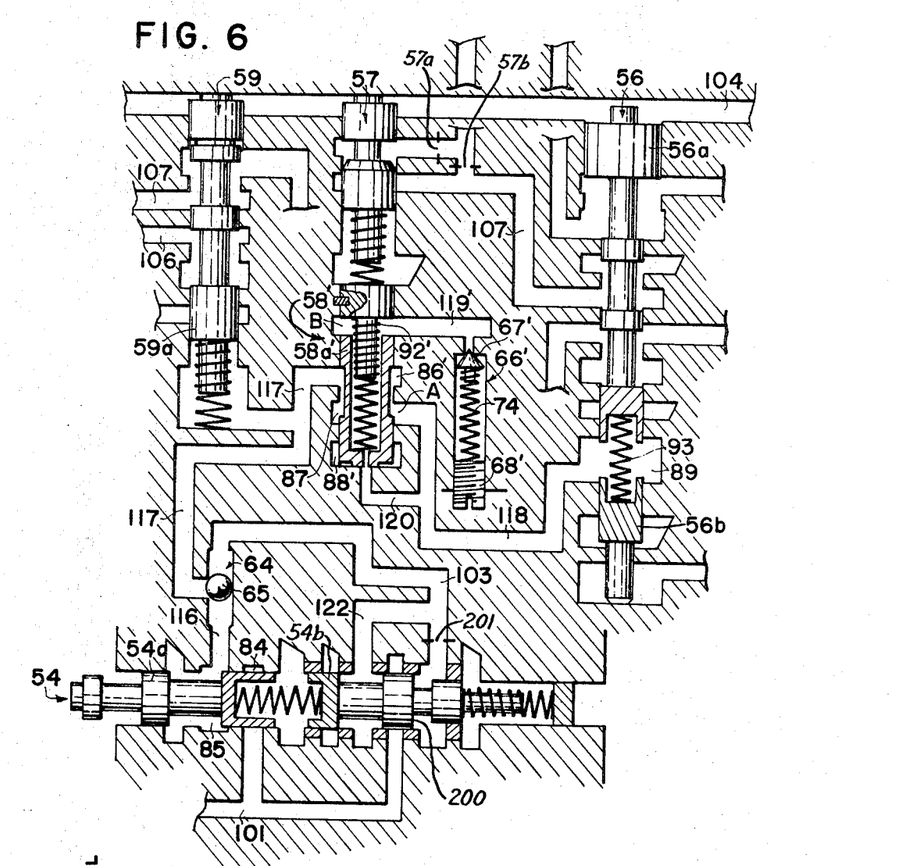
FIG. 6 is an enlarged hydraulic diagram of a main line showing another embodiment of the present invention; and, FIG. 7 is a characteristic diagram of the control oil pressure obtainable in the hydraulic control line according to this invention.

In another embodiment shown in FIG. 6, the same result is obtained using a different type of pilot valve 66'.

Throttle valve 54

Throttle valve 54 has two spools, 54a and 54b with a coil spring 120 between both spools and a coil spring 121 between valve spool 54b and the right end of the throttle valve 54. A displacement proportional to an opening of engine throttle valve acts as a right-directional working force on the left end portion of valve spool 54a and this throttle valve 54 is controlled by the displacement corresponding to the opening of engine throttle valve and spring forces of coil springs 121, 120, since the spring forces of coil springs 121, 120 are set in advance at fixed values this throttle valve 54 is eventually controlled by the displacement corresponding to the opening of the engine throttle valve. That is, when the opening of engine throttle valve is small, the valve spool 54a, as shown in FIG. 4, compresses both springs 120, 121 to move the valve spool 54b rightwards. When the spools move to the position as shown in FIG. 5, oil passage to the oil pump is shut off and the passage of line pressure is immediately opened to produce throttle pressure $Pth$. On the other hand, the throttle pressure $Pth$ is to act on the rear side 200 of valve spool 54b through the orifice 201, therefore the valve spool 54b is pushed by this pressure to return leftwards to shut off the passage of line pressure 101 so as to balance the condition of the throttle pressure from the right direction against both springs 120, 121. This producing a throttle pressure ($Pth$) corresponding to the opening of the engine throttle valve in line 103, which is supplied to one-two shift valve 56 and two-three shift valve 59. Next, when the opening of engine throttle valve becomes larger, the valve spool 54b, as shown in FIG. 5, is moved directly by the valve 54 rightwards to connect line 101 to line 116 so as to supply the line pressure ($P_L$) to shift valves 56, 59. On the other hand, under this condition, line 101 and the line 122 are connected to each other when the small opening of engine throttle valve is shut off, so that throttle pressure ($Pth$) is not produced in line 103.

Ball check valve 64

The throttle pressure ($Pth$) of line 103 and the line pressure ($P_L$) of line 116 obtained by change in the operation of throttle valve are selected by a ball check valve 64 to be taken through one pressure line 117, and now since the line pressure $P_L$ of line 116 is relieved when the engine throttle valve opening is small and the throttle pressure ($Pth$) is acting on line 103, the check ball 65 as shown in FIG. 4 takes a position at the lower side to shut off line 116 and to connect line 103 to line 117, so that the throttle pressure ($Pth$) is supplied to the line 117. Next, when the opening of engine throttle valve becomes large, the line pressure ($P_L$) is supplied to line 116. The check ball 65 moves to the upper position to shut off line 103 and to connect line 116 to line 117, therefore the line pressure ($P_L$) is supplied to the line 117.

One-two shift valve 56 and two-three shift valve 59

Both one-two shift valve 56 and two-three shift valve 59 are controlled by the governor pressure ($Pgo$) of line 104 and the throttle pressure ($Pth$) or line pressure ($P_L$) supplied to the line 117, however in the one-two shift valve 56 and the upper directional shifted position of valve spool 56a (the condition of FIG. 4) is the first speed condition, the lower directional shifted position of valve spool 56a (the condition of FIG. 5) is the second speed condition and in the two-three shift valve 59 the lower directional shifted position (not shown in the diagrams) of valve spool 59a is the third speed condition. The pressure lines of shift valves 56, 59 are changed over in the respective speed change condition as hereinbefore explained. By this change-over, the line pressure ($P_L$) is applied to the required brakes and clutches, thereby the automatic speed change from the first speed to the third speed is able to be carried out.

At this automatic speed changing operation, in case the line pressure ($P_L$) has already been supplied to the line 117, one-two shift valve 56 does not work as explained before. Thus the automatic speed change from the first speed to the second cannot be carried out.

Pressure reducing valve 58

According to this invention a pressure reducing valve 58 is provided between the line 117 and the line 118 which will supply the required oil pressure to the one-two shift valve 56, and this pressure reducing valve 58 includes a coil spring 92 inside the cylinder of its valve spool 58a and said valve spool 58a positions at the lower side by force of said spring 92 to connect three chambers 86, 87 and 88. Thus line 117 connects with line 118 through chambers 86, 87 (the condition of FIG. 4). Next, if the required pressure to be supplied becomes higher than the prescribed value said pressure acts on the lower end portion of valve spool 58a to move the valve spool 58a upwards against the spring force of spring 92 to shut off the chambers 86 and 87 and, as a result, to shut off also communication between the line 117 and the line 118 so that the line 118 is prevented from being applied a pressure which is higher than the prescribed value.

Pilot valve unit 66

There is a line 119 connected from chamber 88 of reducing valve 58 and a pilot valve unit 66 is provided on said line 119. Pilot valve unit 66 which consists of a pilot valve 67, a pilot spring 94 and an adjusting screw 68, acts so as to shut off the opening of line 119 with a check ball serving as pilot valve 67 by means of spring force of spring 94 to form a one-way valve.

According to this invention, the presusre reduction valve 58 is provided between the lines 117, 118 which supply oil pressure for securing the function of the one-two shift valve 56, thereby shutting off said lines when the pressure becomes higher than the prescribed value. The shift valve 56 is protected against this higher applied oil pressure. Therefore even in case high line pressure is supplied to line 117 the oil pressure applied to the line 117 is suppressed below a certain value by reduction valve 58 to be supplied to the one-two shift valve 56, thus the one-two shift valve 56 can carry out automatic speed change.

Since the set pressure of chamber 89 of one-two shift valve 56 can be accurately adjusted by the adjusting screw 68 of pilot valve 66, the speed change point from the first speed to the second speed can be accurately established. Moreover, if a set pressure variable reducing valve is employed, the speed change from the first speed to the second speed can be carried at any optional car velocity and also the set pressure can be adjusted only by the adjusting screw even in the case of the different kinds of engines.

Pilot valve 66'

FIG. 6 shows another example of embodiment of the pressure reduction valve 58 provided between the line 117 and the line 118 which is only slightly different in construction from that of the pressure reduction valve explained in FIG. 4 and FIG. 5. This is a reduction valve capable of changing the set pressure in chamber 89 of one-two shift valve 56 by means of the adjusting screw of the pilot valve, which is provided between the line 117 and the line 118.

The pilot valve 66' consists of a conical pilot valve member 67', a spring 74' and an adjusting screw 68'. And the valve spool 58a' of reduction valve 58' is usually pressed downwards by the coil spring 92'. The opening size at the portion A communicating to the reducing outlet of the line 118 is determined according to the position of the valve spool 58a', so that the portion A is fully opened when the pressure at the high pressure inlet of the line 117 comes down below the set pressure. The pressure of reducing outlet is conducted to the bottom of valve spool 58a' through the line 118 and the line 120. Line 120 communcates to both end chambers of valve spool 58a' through a fine throttle hole.

Accordingly, since the pressure of line 118 is applied to both end surfaces of valve spool 58a', valve spool 58a' is hydraulically balanced when these pressures are equal. If the pressure of line 118 increases, the valve spool 58a' is pushed downwards against the pressure in chamber B and the force of spring 92' to lessen the opening at portion A, thus reducing the pressure.

Moreover, the oil supply line to the two-three shift valve 59 does not have the same reduction valve 58 as that in the oil supply line to the one-two shift valve 56. The reason is due to the fact that, since said two-three shift valve 59 operates only in the drive (D) range condition and is responsive to the gear position of third-speed speed and also such a gear change is carried out at the comparatively high car speed, as is apparent from the characteristic diagram shown in FIG. 7, the line pressure ($P_L$) due to the high car speed in the drive range is comparatively low and at constant pressure regardless of the throttle opening, so that said line pressure has no effect regarding the speed change by the two-three shift valve 59.

It is to be observed therefore that the present invention provides for an improvement in the hydraulic servo mechanism for a transmission having at least two forward speeds. This mechanism has a one-two shift valve 56 for regulating these two speeds with first and second speed line arrangements which selectively acts on clutches and brakes of the vehicle gear arrangement forming particular gear train compositions corresponding to these speeds. Connected to said one-two shift valve 56 is a governor pressure line 104 supplying velocity information and pressure means. The pressure means are also connected to a two position ball check valve 64 and selectively supply to the one-two shift valve either throttle pressure or line pressure. Within the one-two shift valve 56 is a valve spool 56a to selectively determine the interconnections of these lines. The improvement to which the present inventive concept is particularly directed is the aforementioned pressure means connecting ball check valve 64 to said one-two shift valve 56. In said pressure means is a pressure reducing valve 58' with a pressure input line 117 and a pressure output line 118. The pressure input line 117 feeds the output of ball check valve 64 to the pressure reducing valve 58' while pressure output line 118 feeds the output of the pressure reducing valve 58' to the one-two shift valve 56. The interconnection of these two lines 117 and 118 is regulated by a spring biased valve spool means 58a' in pressure reducing valve 58'. Furthermore, the pressure reducing valve 58' is controlled by means of a pilot valve unit 66'. The pressure reducing valve has an elongated main chamber with two ends and sides. Input line 117 leads into a first auxiliary chamber 86 on one side while the output line 86' leaves the main chamber from the other side, the spool valve means 58a' is disposed between said two lines for longitudinal movement in the chamber, and has a spring 92' biasing it. Towards one end of the main chamber there is at least one second auxiliary chamber, in the present embodiment, two are shown, 87' and 88'. The pilot valve unit controls the spring tension and, one version, e.g., pilot valve unit 66' is coupled to one of these second auxiliary chambers whereas the other version, e.g., pilot valve 66' is coupled to the main chamber side. The pilot valve unit in both cases includes an elongated chamber coupled to the pressure reducing valve by a line, 119 or 119' and has a spring biased valve, 67 or 67'. An important feature of the pilot valve unit is the provision of adjustable screw means 68 or 68' which serves to adjust the spring tension in the pilot valve which in turn adjusts the shift position of the pressure reducing valve 58 and the one-two shift valve 56.

What is claimed is:

1. In a hydraulic servo mechanism for a transmission with at least two forward speeds, said mechanism having:
   (a) a one-two shift valve (56) for regulating said two speeds including first and second speed line arrangements selectively acting on clutches and brakes of a vehicle gear arrangement to determine particular gear train compositions corresponding to said speeds;
   (b) a governor pressure line (104) connected to said one-two shift valve (56);
   (c) pressure means connected at a first end to said one-two shift valve (56) and at the second end to a two position check valve (64) to selectively supply throttle pressure or line pressure to said one-two shift valve (56);
   (d) a valve spool (56a) in said one-two shift valve (56) to selectively determine the interconnections of said lines;

the improvement in the aforesaid mechanism comprising in combination:
   (e) a pressure reducing valve (58) in said pressure means, a pressure input line (117) feeding the output of said check valve (64) to said pressure reducing valve (58), a pressure output line (118) feeding the output of said presure reducing valve (58) to said one-two shift valve (56), said pressure reducing valve being an elongated main chamber with two ends and sides, said input line (117) leading into an auxiliary chamber section (86) on one side and said output line (118) leading out of the other side main chamber, said valve spool means being disposed for longitudinal movement in said chamber between said input line (117) and said output line (118) with a spring biasing said spool means, said elongated main chamber having at least one auxiliary chamber (87, 88) towards one end, said pilot valve unit being coupled to one of the chambers so as to act on the spring to control the tension thereof;

(f) spring biased valve spool means (58a) regulating the interconnection of said pressure input line (117) and said pressure output line (118) by the position of said valve spool means (58a) in said valve; and, (g) a pilot valve unit (66) including adjusting means coupled to said pressure reducing valve disposed for adjustment the pressure within said pressure reducing vavle (58).

2. A servo mechanism, as claimed in claim 1, said pilot valve unit being coupled to said auxiliary chamber.

3. A servo mechanism as claimed in claim 1, said pilot valve being coupled to the side of said main chamber.

4. A servo mechanism as claimed in claim 2 wherein said pilot valve means (66) includes an elongated chamber coupled at one end to said second auxiliary chamber (87, 88) by a line (119), a valve (67) in said chamber, at said coupling end, a spring in said chamber biasing said valve (67) and, adjustable means (68) for adjusting said spring tension.

5. A servo mechanism as claimed in claim 3 wherein said pilot valve means (66') includes an elongated chamber coupled at one end to said main chamber side by a line (119'), a valve (67') in said chamber, at said coupling end, a spring in said chamber biasing said valve (67') and, adjustable means (68') for adjusting said spring tension.

References Cited

UNITED STATES PATENTS

| | | | |
|---|---|---|---|
| 3,393,585 | 7/1968 | Pierce, Jr. | 74—864 |
| 3,401,581 | 9/1968 | Chana | 74—864 |
| 3,465,614 | 9/1969 | Reynolds | 74—869X |

CORNELIUS J. HUSAR, Primary Examiner